United States Patent
Li

(10) Patent No.: US 10,345,767 B2
(45) Date of Patent: Jul. 9, 2019

(54) APPARATUS AND METHOD FOR GAMIFICATION OF SENSOR DATA INTERPRETATION IN SMART HOME

(71) Applicant: Samsung Electronics Co., Ltd., Suwon-si, Gyeonggi-do (KR)

(72) Inventor: Zhiyun Li, Kenmore, WA (US)

(73) Assignee: Samsung Electronics Co., Ltd., Suwon-si (KR)

(*) Notice: Subject to any disclaimer, the term of this patent is extended or adjusted under 35 U.S.C. 154(b) by 809 days.

(21) Appl. No.: 14/463,193

(22) Filed: Aug. 19, 2014

(65) Prior Publication Data

US 2016/0055422 A1 Feb. 25, 2016

(51) Int. Cl.
*G05B 15/02* (2006.01)

(52) U.S. Cl.
CPC ...... *G05B 15/02* (2013.01); *G05B 2219/2642* (2013.01)

(58) Field of Classification Search
CPC ............ G05B 15/02; G05B 2219/2642; H02J 13/001; H02J 13/0062; Y02B 70/3216; G06Q 30/02; G06Q 10/109; G06Q 10/10; G06Q 50/26; Y02P 90/02; G06K 9/00771; G06K 9/00; G06K 9/00362; A61B 2560/0242; A61B 5/0022; A61B 5/1113; A61B 5/1117; G08B 25/008; G06N 99/005; G06N 5/04; H04Q 9/00
See application file for complete search history.

(56) References Cited

U.S. PATENT DOCUMENTS

| | | | |
|---|---|---|---|
| 2007/0156256 A1* | 7/2007 | Jung | G05B 15/02 700/19 |
| 2010/0324962 A1* | 12/2010 | Nesler | G01R 21/133 705/7.36 |
| 2011/0061015 A1* | 3/2011 | Drees | G05B 15/02 715/771 |
| 2013/0006899 A1* | 1/2013 | Cook | G06K 9/00771 706/12 |
| 2013/0150686 A1* | 6/2013 | Fronterhouse | G06F 19/3418 600/323 |
| 2014/0136135 A1* | 5/2014 | Drukier | G01T 7/005 702/94 |
| 2014/0180761 A1* | 6/2014 | Yolles | G06Q 50/06 705/7.29 |

(Continued)

OTHER PUBLICATIONS

'The role of prediction algorithms in the MavHome smart home architecture': Das, 2002, IEEE wireless communications, 1536-1284.*

(Continued)

*Primary Examiner* — Robert A Cassity
*Assistant Examiner* — Peter D Coughlan

(57) ABSTRACT

An apparatus and method for correlating events in a smart home system as a pattern. The apparatus and method include collecting from smart home devices, state change events of the smart home system, determining whether a series of the collected state change events are a known pattern, requesting, when the series of the collected state change events is an unknown pattern, users of the smart home system to identify what caused the collected state change events, and judging, by the smart home users, a best reason among the identified causes of the collected state change events.

13 Claims, 9 Drawing Sheets

(56) References Cited

U.S. PATENT DOCUMENTS

2014/0205155 A1* 7/2014 Chung .............. G06K 9/00362
382/115

OTHER PUBLICATIONS

Human activity recognition and pattern discovery:Kim, 2010, IEEE, 1536-1269.*
Activity Recognition in the Home Using Simple and Ubiquitous Sensors: Tapia, pp. 158-175; Pervasive Computing LNCS 3001, 2004.*

* cited by examiner

APPARATUS AND METHOD FOR GAMIFICATION OF SENSOR DATA INTERPRETATION IN SMART HOME

TECHNICAL FIELD

The present disclosure relates to an apparatus and method interpretation of raw data produced by a Smart Home system. The Smart Home raw data is presented to users who define an event that occurs when the data is presented and in return receives a reward for their input. Through repetition of a data/definition sequence the Smart Home is able to provide meaningful interpretation of raw data.

BACKGROUND

Currently, Smart Home devices generate a large volume of data. A typical smart home comprises a wide variety of sensors, continuously sampling temperature, pressure, EM field, light, motion, air quality, sound, humidity, and the like. Each sensor is producing an infinite sequence of sampling data, which is transmitted to a central gateway.

The central gateway stores the raw data and the raw data may be retrieved by a user or administrator.

Accordingly, an apparatus and a method thereof that solicits input from users in a vicinity of the Smart Home when changes occur in the raw data produced by Smart Home Devices and rewarding the users for their input.

SUMMARY

Aspects of the present disclosure are to address at least the above-mentioned problems and/or disadvantages and to provide at least the advantages described below. Accordingly, an aspect of the present disclosure is to provide a system and method to provide meaningful interpretation of raw data in a smart home system.

In accordance with an aspect of the present disclosure, a method correlating events in a smart home system as a pattern is provided. The method includes collecting from smart home devices state change events of the smart home system, determining whether a series of the collected state change events are a known pattern, requesting, when the series of the collected state change events is an unknown pattern, that users of the smart home system identify what caused the collected state change events, and judging, by the smart home users, a best reason among the identified causes of the collected state change events.

In accordance with an aspect of the present disclosure, a gateway apparatus of a smart home system is provided. The apparatus includes a gamification module configured to collect from smart home devices state change events of the smart home system, to determine whether a series of the collected state change events are a known pattern, to request, when the series of the collected state change events is an unknown pattern, users of the smart home system to identify what caused the collected state change events, and to judge, by the smart home users, a best reason among the identified causes of the collected state change events.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
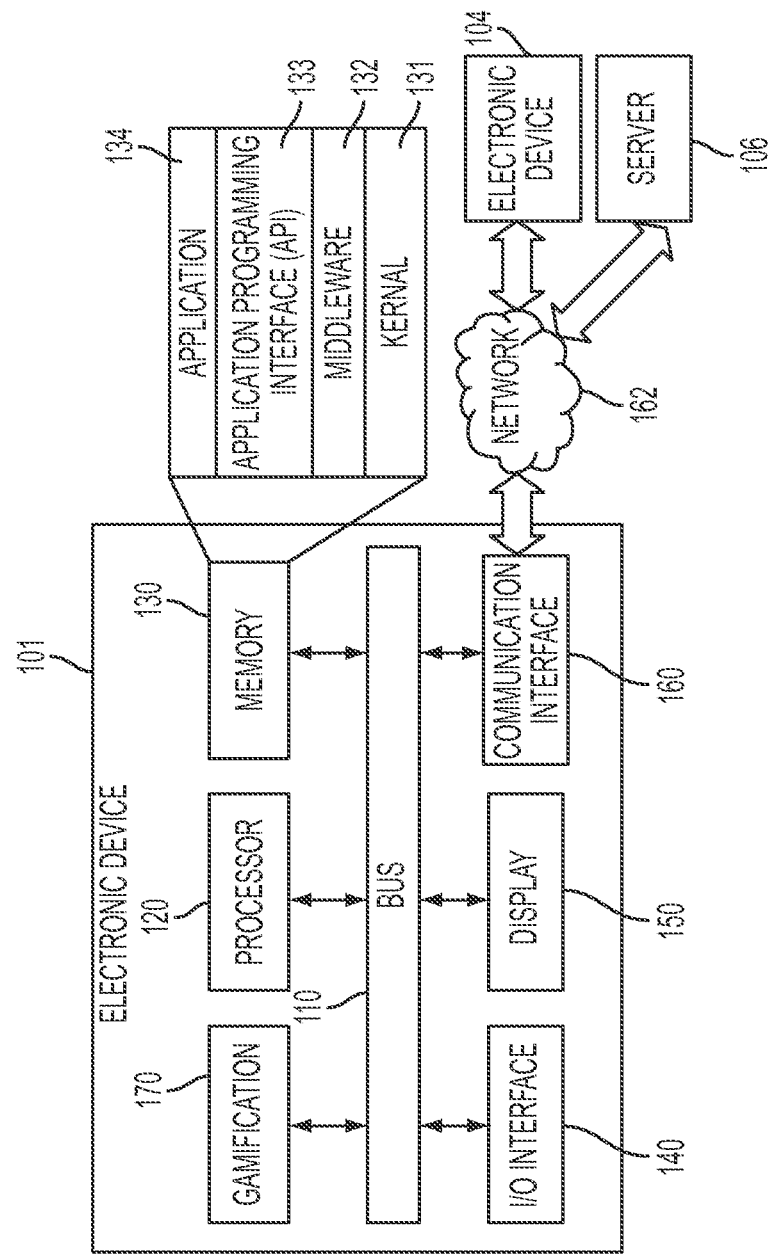
FIG. 1 illustrates a network environment including an electronic device according to various embodiments of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

FIG. 1 illustrates a network environment including an electronic device according to various embodiments of the present disclosure.

Referring to FIG. 1, a network environment 100 includes an electronic device 101. The electronic device 101 may include a bus 110, a processor 120, a memory 130, an Input/Output (I/O) interface 140, a display 150, a communication interface 160, a gamification module 170, and/or the like.

The bus 110 may be circuitry that connect the foregoing components and allow communication between the foregoing components. For example, the bus 110 may connect components of the electronic device 101 so as to allow control messages and/or other information to be communicated between the connected components.

The processor 120 may, for example, receive instructions from other components (e.g., the memory 130, the I/O interface 140, the display 150, the communication interface 160, the gamification module 170, and/or the like), interpret the received instructions, and execute computation or data processing according to the interpreted instructions.

The memory 130 may, for example, store instructions and/or data that are received from, and/or generated by, other components (e.g., the memory 130, the I/O interface 140, the display 150, the communication interface 160, the gamificationn module 170, and/or the like). For example, the memory 130 may include programming modules such as a kernel 131, a middleware 132, an Application Programming Interface (API) 133, an application 134, and/or the like. Each of the foregoing programming modules may include a combination of at least two of software, firmware, or hardware.

The kernel 131 may control or manage system resources (e.g., the bus 110, the processor 120, the memory 130, and/or the like) that may be used in executing operations or functions implemented in other programming modules such as, for example, the middleware 132, the API 133, the application 134, and/or the like. The kernel 131 may provide an interface for allowing or otherwise facilitating the middleware 132, the API 133, the application 134, and/or the like, to access individual components of electronic device 101.

The middleware 132 may be a medium through which the kernel 131 may communicate with the API 133, the application 134, and/or the like to send and receive data. The middleware 132 may control (e.g., scheduling, load balancing, and/or the like) work requests by one or more applications 134. For example, the middleware 132 may control work requests by one or more applications 134 by assigning priorities for using system resources (e.g., the bus 110, the processor 120, the memory 130, and/or the like) of electronic device 101 to the one or more applications 134.

The API 133 may be an interface that may control functions that the application 134 may provide at the kernel 131, the middleware 132, and/or the like. For example, the API 133 may include at least an interface or a function (e.g., command) for file control, window control, video processing, character control, and/por the like.

According to various embodiments of the present disclosure, the application 134 may include a Short Message Service (SMS) application, a Multimedia Messaging Service (MMS) application, an email application, a calendar application, an alarm application, a health care application (e.g., an exercise amount application, a blood sugar level measuring application, and/or the like), an environmental information application (e.g., an application that may provide atmospheric pressure, humidity, temperature information, and/or the like), an instant messaging application, a call application, an internet browsing application, a gaming application, a media playback application, an image/video capture application, a file management application, and/or the like. In addition to or as an alternative to, the application 134 may be an application that is associated with information exchange between the electronic device 101 and an external electronic device (e.g., electronic device 104). As an example, the application 134 that is associated with the information exchange may include a notification relay application that may provide the external electronic device with a certain type of information, a device management application that may manage the external electronic device, and/or the like.

As an example, the notification relay application may include a functionality that provides notification generated by other applications at electronic device 101 (e.g., the SMS/MMS application, the email application, the health care application, the environmental information application, the instant messaging application, the call application, the internet browsing application, the gaming application, the media playback application, the image/video capture application, the file management application, and/or the like) to an external electronic device (e.g., the electronic device 104). In addition to or as an alternative to, the notification relay application may provide, for example, receive notification from an external electronic device (e.g., the electronic device 104), and may provide the notification to a user.

As an example, the device management application may manage enabling or disabling of functions associated with least a portion of an external electronic device (e.g., the external electronic device itself, or one or more components of the external electronic device) in communication with electronic device 101, controlling of brightness (or resolution) of a display of the external electronic device, an application operated at, or a service (e.g., a voice call service, a messaging service, and/or the like) provided by, the external electronic device, and/or the like.

According to various embodiments of the present disclosure, as an example, the application 134 may include one or more applications that are determined according to a property (e.g., type of electronic device, and/or the like) of the external electronic device (e.g., the electronic device 104). For example, if the external electronic device is an mp3 player, the application 134 may include one or more applications related to music playback. As another example, if the external electronic device is a mobile medical device, the application 134 may be a health care-related application. According to various embodiments of the present disclosure, the application 134 may include at least one of an application that is preloaded at the electronic device 101, an application that is received from an external electronic device (e.g., the electronic device 104, a server 106, and/or the like), and/or the like.

The I/O interface 140 may, for example, receive instruction and/or data from a user. The I/O interface 140 may send the instruction and/or the data, via the bus 110, to the processor 120, the memory 130, the communication interface 160, the gamification module 170, and/or the like. For example, the I/O interface 140 may provide data associated with user input received via a touch screen to the processor 120. The I/O interface 140 may, for example, output instructions and/or data received via the bus 110 from the processor 120, the memory 130, the communication interface 160, the gamification module 170, and/or the like, via an I/O device (e.g., a speaker, a display, and/or the like). For example, the I/O interface 140 may output voice data (e.g., processed using the processor 120) via a speaker.

The display 150 may display various types of information (e.g., multimedia, text data, and/or the like) to the user. As an example, the display 150 may display a Graphical User Interface (GUI) with which a user may interact with the electronic device 101.

The communication interface 160 may provide communication between electronic device 101 and one or more external electronic devices (e.g., the electronic device 104, the server 106, and/or the like). For example, the communication interface 160 may communicate with the external electronic device by establishing a connection with a network 162 using wireless or wired communication. As an example, wireless communication with which the communication interface 160 may communicate may be at least one of, Wi-Fi, Bluetooth, Near Field Communication (NFC), Global Positioning System (GPS), cellular communication (e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like), Infrared Data Association (IrDA) technology, and/or the like. As an example, wired communication with which the communication interface 160 may communicate may be at least one of, for example, Universal Serial Bus (USB), High Definition Multimedia Interface (HDMI), Recommended Standard 232 (RS-232), Plain Old Telephone Service (POTS), Ethernet, and/or the like.

According to various embodiments of the present disclosure, the network 162 may be a telecommunications network. As an example, the telecommunications network may include at least one of a computer network, the Internet, the Internet of Things, a telephone network, and/or the like. According to various embodiments of the present disclosure, a protocol (e.g., a transport layer protocol, a data link layer protocol, a physical layer protocol, and/or the like) for communicating between electronic device 101 and an external electronic device may be supported by, for example, at least one of the application 134, the API 133, the middleware 132, the kernel 131, the communication interface 160, and/or the like.

Figure 4:
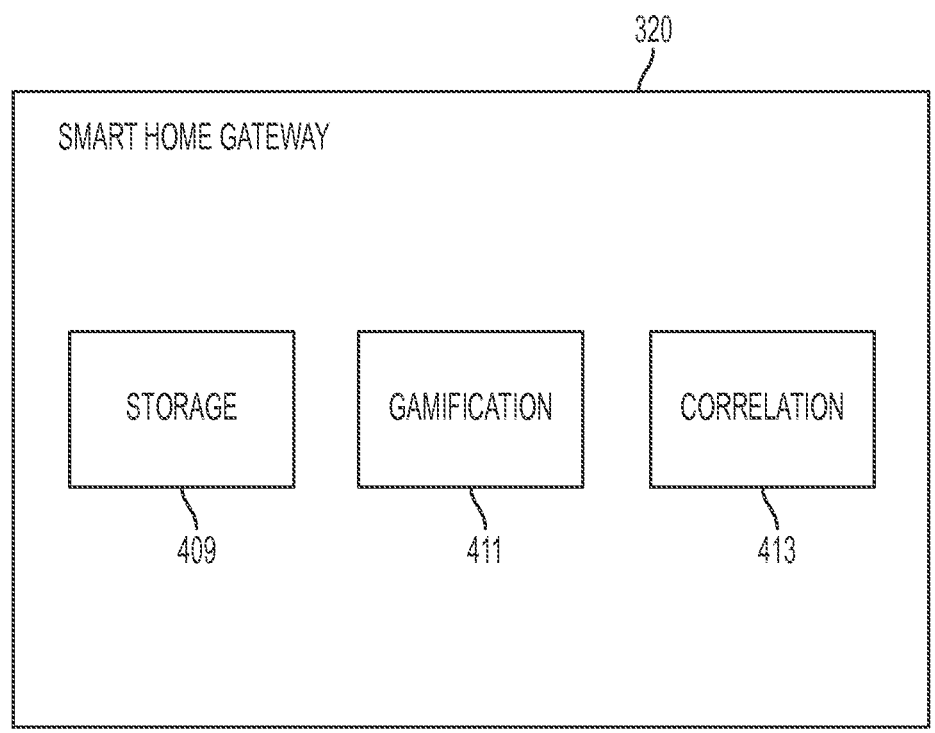
FIG. 4 illustrates a home gateway of a smart home system that according to an embodiment of the present disclosure.

The gamification module 170 may, for example, process at least a part of information received from other components (e.g., the processor 120, the memory 130, the I/O interface 140, the communication interface 160, and/or the like), and provide various information, services, and/or the like to the user in various manners. For example, the gamification module 170 may control via the processor 120 or independently at least some of the functions of the electronic device 101 to communicate or connect to another electronic device (e.g., the electronic device 104, the server 106, and/or the like). FIG. 4 will provide additional information regarding the gamification module 170.

Figure 2:
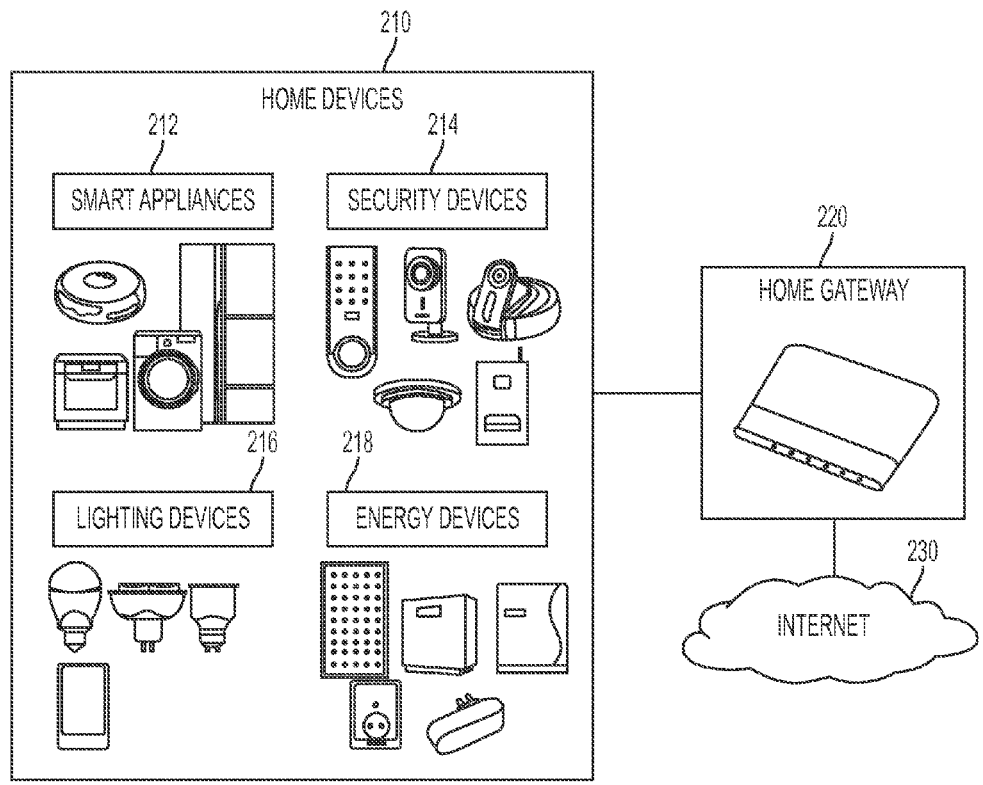
FIG. 2 illustrates a simplified structure of a home network system according to an embodiment of the present disclosure.

FIG. 2 illustrates a simplified structure of a home network system according to an embodiment of the present disclosure.

Referring to FIG. 2, a home network system is configured to include home devices 210 having a control and communication function and a Home GateWay (HGW) 220. The home devices 210 are located inside (or outside) a house, and include smart appliances 212, security devices 214, lighting devices 216, energy devices 218, and the like. For example, the smart appliances 312 correspond to a Television (TV), an air-conditioner, a refrigerator, a washing machine, a robot-cleaner, a humidifier, and the like. The security devices 214 correspond to a door-lock, a security camera, a Closed Circuit Television (CCTV), and a security sensor that senses a contact, a sound, a movement, and the like, the lighting devices 216 correspond to a Light Emitting Diode (LED), a lamp, and the like, and the energy devices 318 may correspond to a heater, a power meter, a power socket, an electrical outlet, a multiple-tap, and the like. In addition, the home devices 210 may include a Personal Computer (PC), an IP camera, an Internet phone, a wired/wireless phone, a mobile phone used in a home, a curtain or blind that may be electrically controlled, and the like.

The home devices 210 may be capable of performing communication with the home gateway 220 according to a wired or wireless communication scheme, and may be configured to receive a control command from the home gateway 120, to operate based on the control command, and to transmit requested information and/or data to the home gateway 220.

The home gateway 220 may be embodied as an independent apparatus, or an apparatus equipped with a home gateway function. For example, the home gateway 120 may be embodied as a television, a cellular phone, a tablet computer, a set-top box, a robot cleaner, or a personal computer. The home gateway 220 may be equipped with corresponding communication modules for performing communication with the home devices 210 based on a wired or wireless communication scheme, so as to register and store information associated with the home devices 210, to manage and control operations, supportable functions, and states of the home devices 210, and to collect and store required information from the home devices 210. Particularly, the home gateway 220 may be connected with a data network such as the Internet, that is, an IP network 230, and allows a connection by a communication terminal through the Internet 230 and transfers a control signal received from the communication terminal to a corresponding home device. Also, the home gateway 220 may communicate with the communication terminal using a wireless communication scheme such as WiFi (Wireless Fidelity), Zigbee, Bluetooth, an NFC (Near Field Communication), and z-wave.

The home network system configured as described above may provide a home entertainment service, such as an Internet TV (IPTV) through the Internet 230, a Video on Demand (VoD) and the like, a home data communication service such as data sharing, Voice over IP (VoIP), a video phone, and the like, and a home automation service such as remote control of an electrical appliance, a remote meter reading, crime prevention, disaster prevention and the like. That is, the home network system may connect all types of home devices used inside and outside a house through a single network for a control.

Meanwhile, a user may connect with a home gateway included in the home network system from the outside of the house using a communication terminal such as a mobile terminal, or may remotely connect with each home device through the home gateway. The mobile terminal may be, for example, a Personal Digital Assistant (PDA) including a communication function, a Smart Phone, a feature phone, a tablet Personal Computer (PC), a notebook and the like, and may access a home network system directly or through a provider's network and the Internet.

Figure 3:
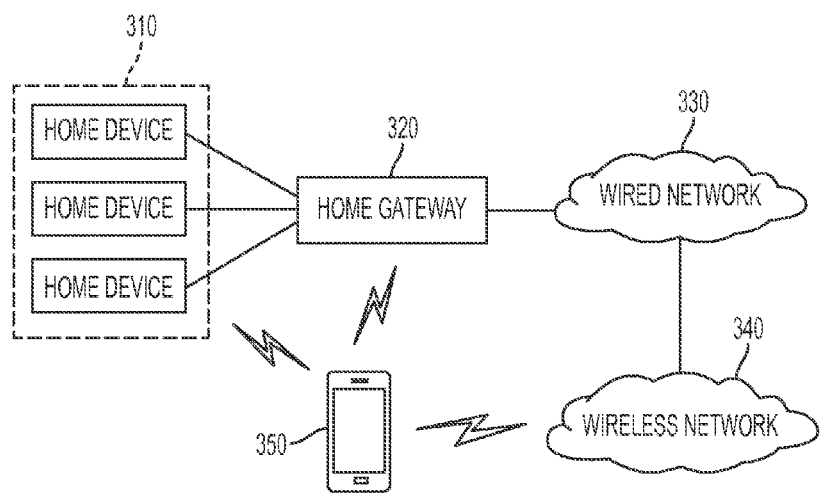
FIG. 3 illustrates a simplified configuration of a home network system that is capable of connecting with a mobile terminal according to an embodiment of the present disclosure.

FIG. 3 illustrates a simplified configuration of a smart home system that is capable of connecting with a mobile terminal according to an embodiment of the present disclosure.

Referring to FIG. 3, the home devices 310 in the home network system connects with the home gateway 320 through a wired or wireless communication scheme. The home gateway 320 may connect with a wired network 330 such as the Internet. A registered mobile terminal 350 may connect with a wireless network 340 including a wireless access network and a provider core network, and may access the home gateway 420 through the wired network 330. A wireless network 340 may be a 2nd Generation (2G) or 3G cellular communication system, 3rd Generation Partnership Project (3GPP), a 4G communication system, Long-Term Evolution (LTE), World Interoperability for Microwave Access (WiMAX), and the like. Also, the mobile terminal 350 may directly communicate with the home gateway 420 using a wireless communication scheme such as WiFi, Zigbee, Bluetooth, an NFC, and z-wave. The mobile terminal 350 may directly communicate with the home devices 310 via NFC, Bluetooth, and the like.

FIG. 4 illustrates a home gateway of a smart home system that according to an embodiment of the present disclosure.

Figure 5A:
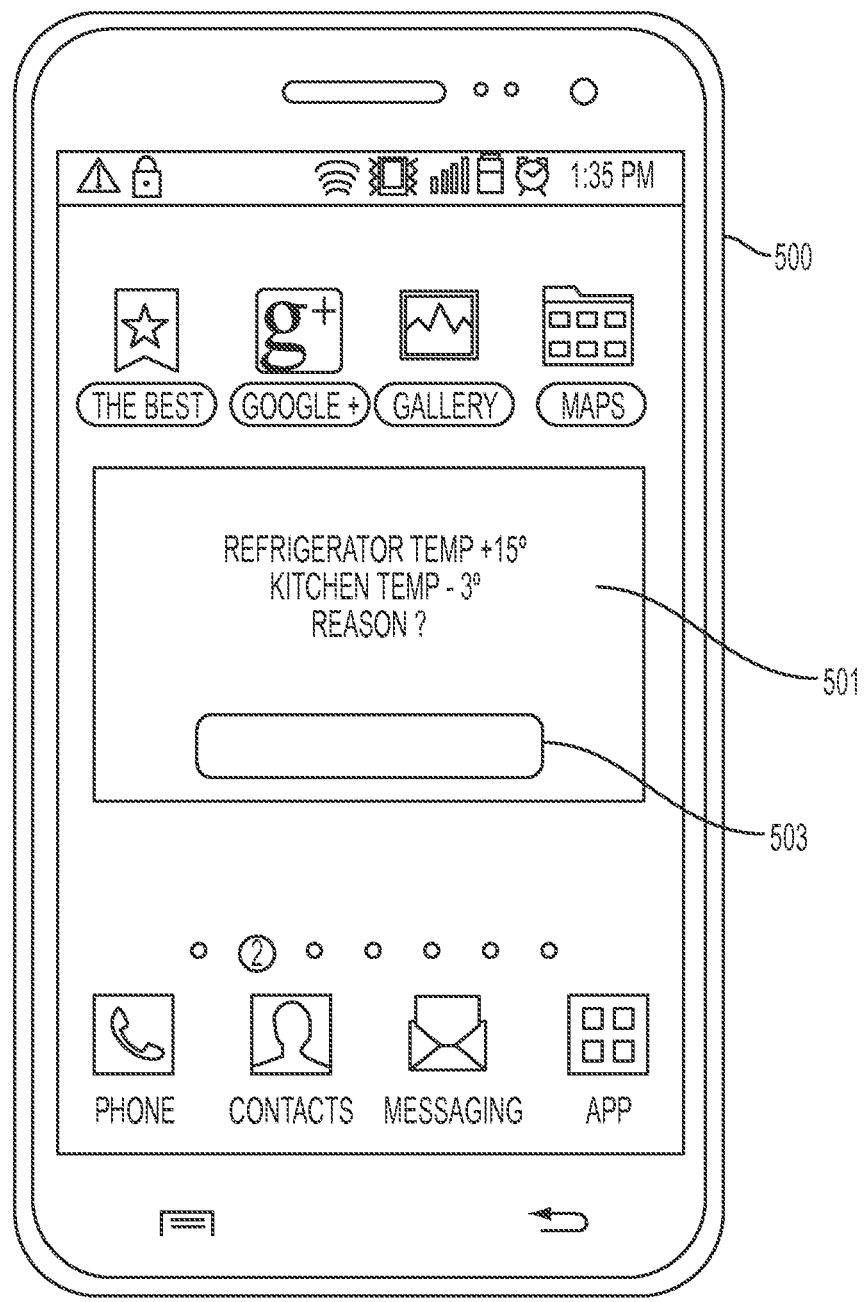
FIGS. 5A, 5B, and 5C illustrate a mobile device receiving information from a gamification module according to an embodiment of the disclosure.
Figure 5B:
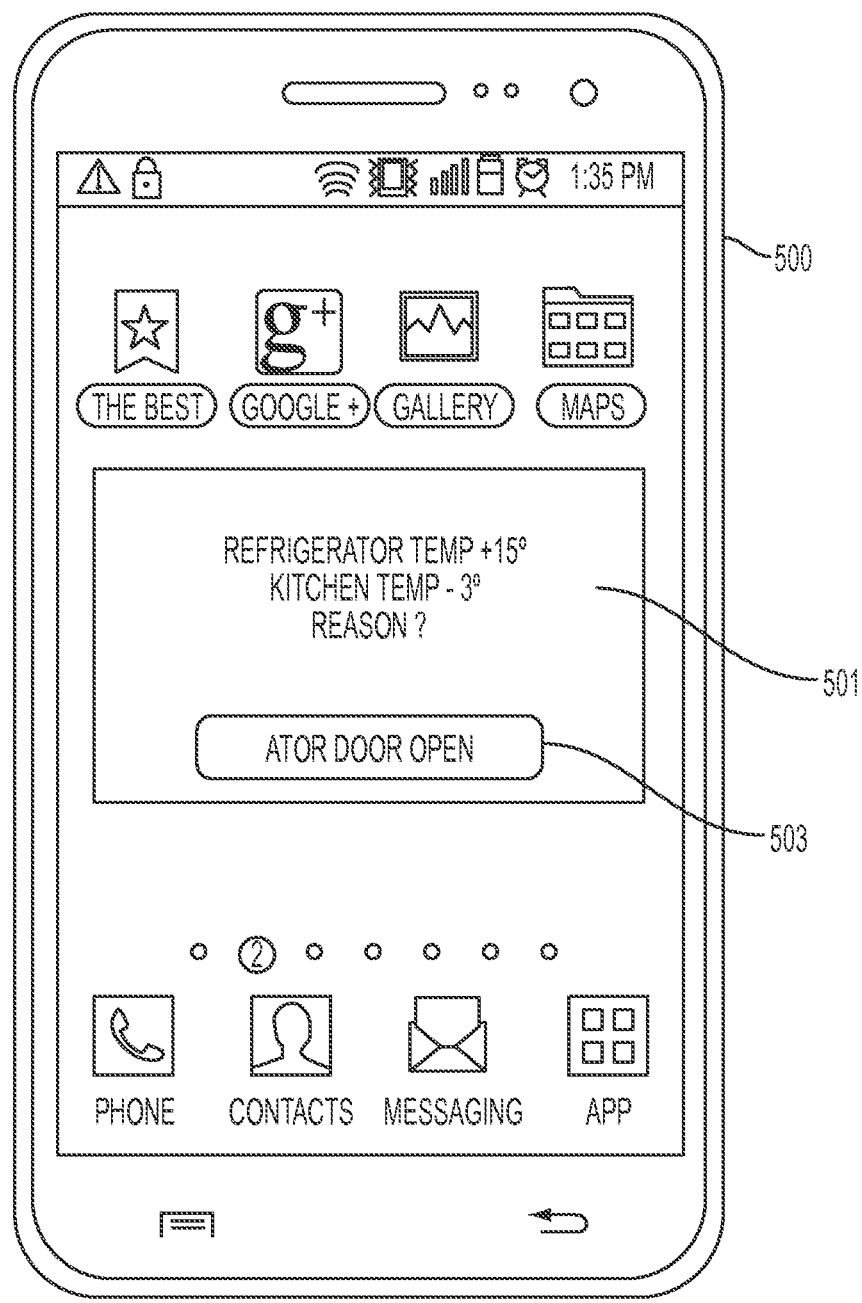
Figure 5C:
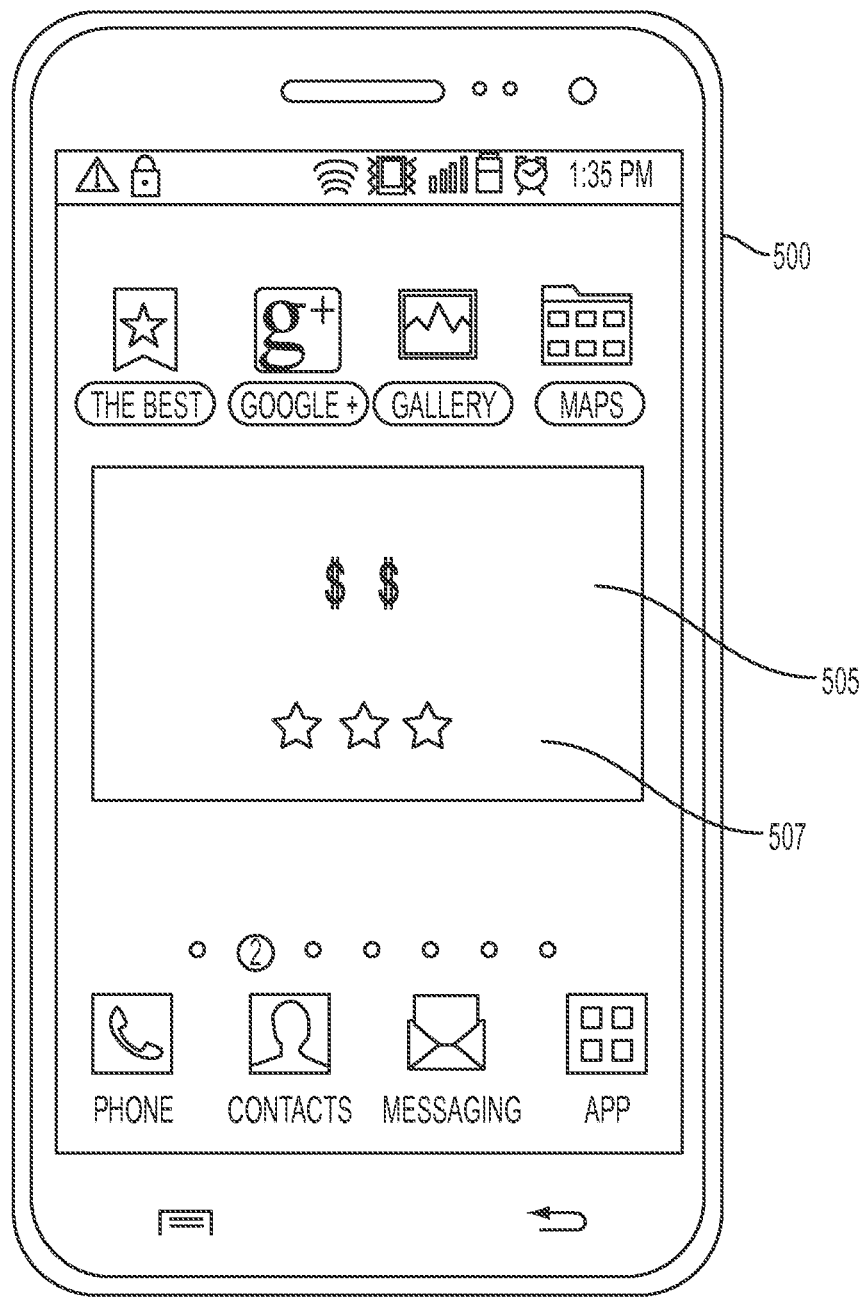

FIGS. 5A, 5B, and 5C illustrate a mobile device receiving information from a gamification module according to an embodiment of the disclosure.

Referring to FIGS. 4, 5A, 5B and 5C, the smart home gateway 320 includes storage 409, gamification module 411 and correlation module 413, but is not limited thereto.

The smart home gateway 320 receives information from the home devices 310. That is, one of the home devices 310, for example, a refrigerator in smart appliances 212 (See FIG. 2), detects an increase of temperature beyond a threshold amount and sends raw data to the home gateway 320 indicating the temperature increase and the data is stored in the storage 409.

Shortly thereafter, another home device 310, for example, a thermostat of energy devices 218, detects a decrease of temperature beyond a threshold amount and sends raw data to the home gateway 320 indicating the temperature decrease in for example, a kitchen of the smart home.

Each of these events is detected by the gamification module 411. The gamification module 411 has the correlation module 413 determine whether there is correlation between these two events. The correlation module 413 determines that there is no known correlation. The gamification module 411 in response sends a game question to a mobile terminal 500 to define what has occurred in the kitchen to cause the temperature within the refrigerator to increase and the temperature within the kitchen to decrease.

While the mobile terminal 500 is illustrated as a single mobile terminal, it will be understood that the mobile terminal may be a plurality of mobile terminals belonging to any individual with rights or access to an area where the smart home system is installed. In a typical situation, this would include all family members in a household where the smart home system is installed. However, if there is a housekeeper working in the home, he or she may be included in the group with rights or access to the smart home system via their mobile terminal 500.

Additionally, an individual may have rights to a plurality of different smart home systems. Thus, when an individual has multiple homes or the individual's place of business has a smart home system, the individual's mobile terminal 500 may be registered with each smart home system.

Referring to FIG. 5A, the gamification module 411 sends a message to the mobile device 500. The mobile device displays the message "Refrigerator temp increased 15" and "Kitchen temp decreased 3", "Please enter reason?" 501. The mobile device 500 may also displays an input field 503 for entering text with a response to the query. It will be understood that if this is not the first time such a series of invents has occurred or there are multiple reasons given, the input field may be a pull down menu defining the multiple options for input based upon past events.

Referring to FIG. 5B, the user of the mobile device 500 enters the reason "Refrigerator door open" in the input field 503 and hits the carriage return. The mobile device 500 transmits the reason back to the gateway.

Referring to FIG. 5C, the user of the mobile device 500 receives information on compensation 505 or judgment 507. That is when each mobile device 500 registered with the smart home system receives a request to submit a reason the smart home events occurred, each user enters the reason they considered to be the best of the most likely reason the sequence of change states events of the smart home system occurred. In response to each user entering the best reason, each other user gets to judge the other user's reason. Based upon the collective judgment, one reason may be considered the beast reason. In response to this, a user may receive the judgment 507, for example, three stars or be compensated with money, tokens, points or other compensation.

Figure 6:
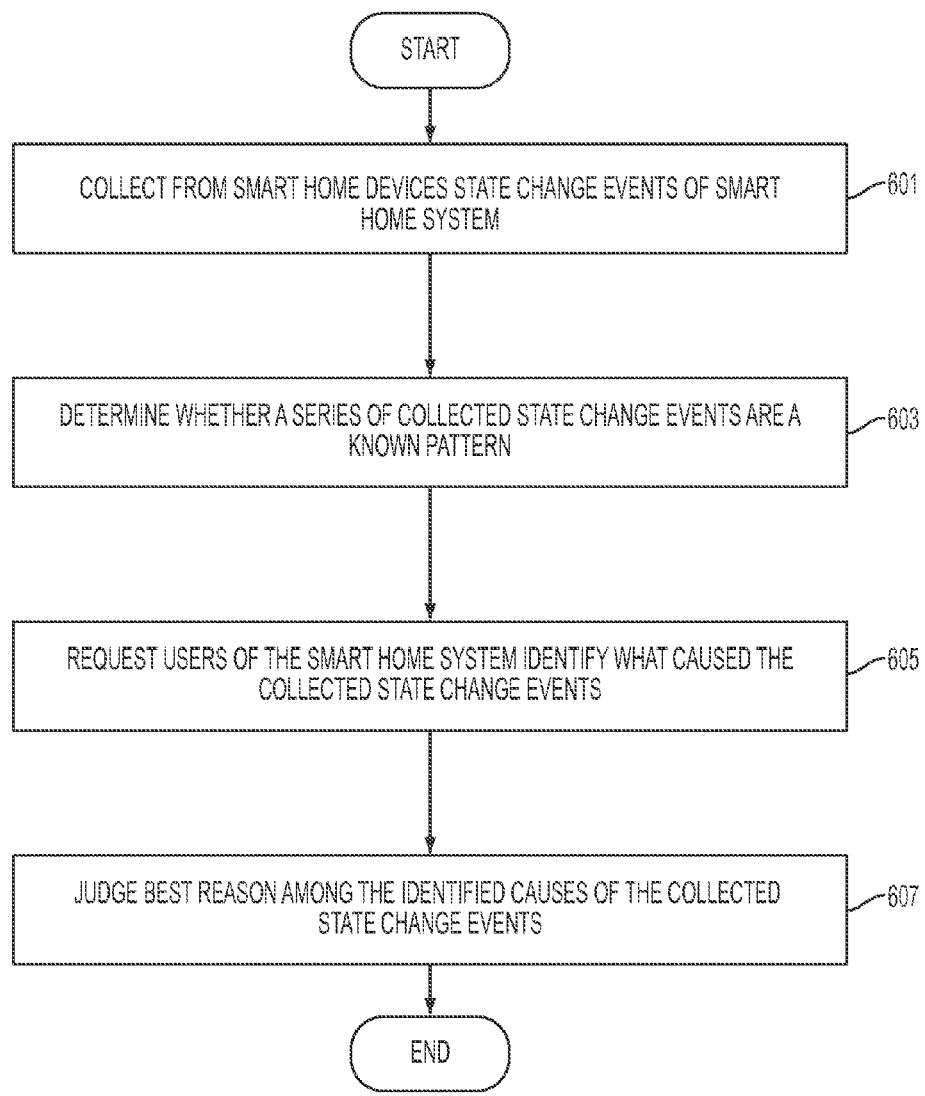
FIG. 6 illustrates a graph for pattern recognition and action suggestion according to various embodiments of the present disclosure.

FIG. 6 is a flowchart of a method of an embodiment of the present disclosure.

Referring to FIG. 6, a gateway of a smart home system may collect from smart home devices state change events of a smart home system in operation 601. That is, the smart home system of FIG. 2 collects information on each of the group of devices, the smart appliances 212, the security devices 214, the lighting devices 216, the energy devices 218, and the like. The state change events indicate when there is a change in the state of the device or the surrounding environment. The state change events are stored by the smart home gateway.

In operation 603, the gateway of the smart home system may determine whether a series of the collected state change events are a known pattern. That is, the gateway determines whether there are events which have been correlated or identified in the past. If the collected state change events have been identified in the past, it may be necessary to determine that the smart home systems trusts the identification the collected state change events. The trust factor of the identification of the collected state change events may be determined by the number of users who have identified the collected state change events or the number of time collected state change events have been repeated and identified.

In operation 605, when the series of the collected state change events is an unknown pattern, request users of the smart home system to identify what caused the collected state change events request. That is, the gateway transmits to a gamification application (hereinafter app) on the user's mobile device 500 a request to identify the collected state change events. The gamification app displays the information and request the user enter information identifying the collected state change events. Each of the mobile devices 500 transmits this information back to the gateway to the gamification module 411.

In operation 605, the gateway transmits the each user's identified collected state change events to the other user's of the smart home system and they each vote on the best identification of the collected state change events.

Figure 7A:
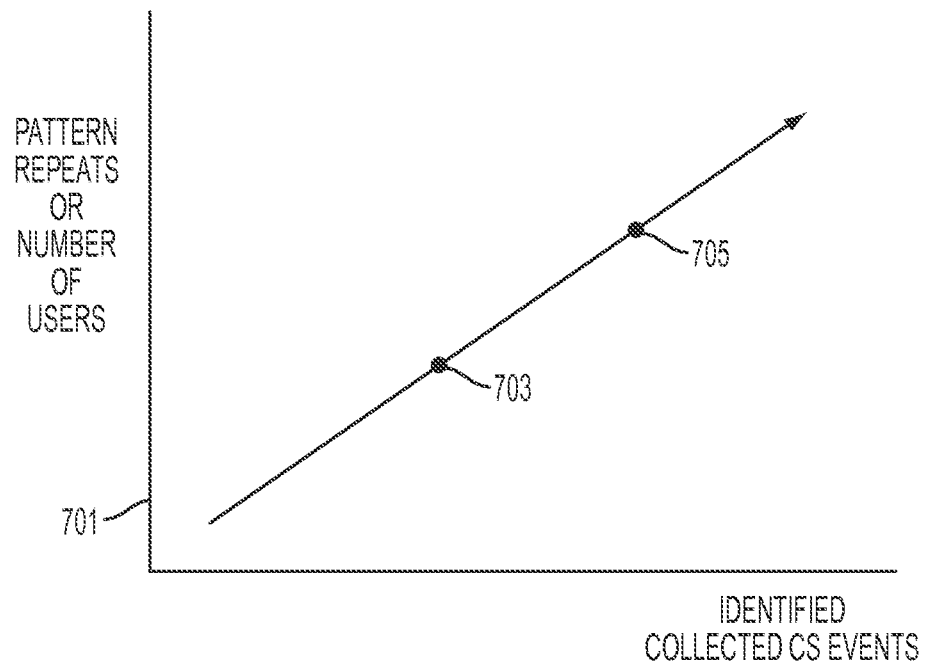
FIGS. 7A and 7B illustrate a display of confirmation of an action by a mobile device according to embodiments of the present disclosure.

FIG. 7A is a graph of the increased probability an event has been correctly characterized as an embodiment of the present disclosure.

Referring to FIG. 7A, a graph 701 indicates a trustworthiness or trust factor of identified collected change state events. The graph indicates that as the number of sets of collected change state events increases, the trustworthiness of the identified collected change state events increases as wither the number of identifications increases or the number of users who have identified the collected change state events increases.

Thus, the identified collected change state events that have been repeatedly identified over a period of weeks 705 increases, the trustworthiness of the identification increases. Likewise, if every user of the smart home system makes the same identification of the collected change state events, the identified collected change state events may be considered trustworthy at point 703. Such a determination of a threshold for when the identified collected change state events are considered trustworthy and therefore need not be repeated, is made by a system administrator. However, it will be understood that such a trustworthiness of this type only gives higher confidence of this particular dataset at that point in time. As such further repetition is required, since the sensor data may have noise, the more datasets to be identified to the pattern, the more robust the trustworthiness will be. Until the robustness reaches a threshold, then the system can confirm this is a known trustworthy pattern.

Figure 7B:
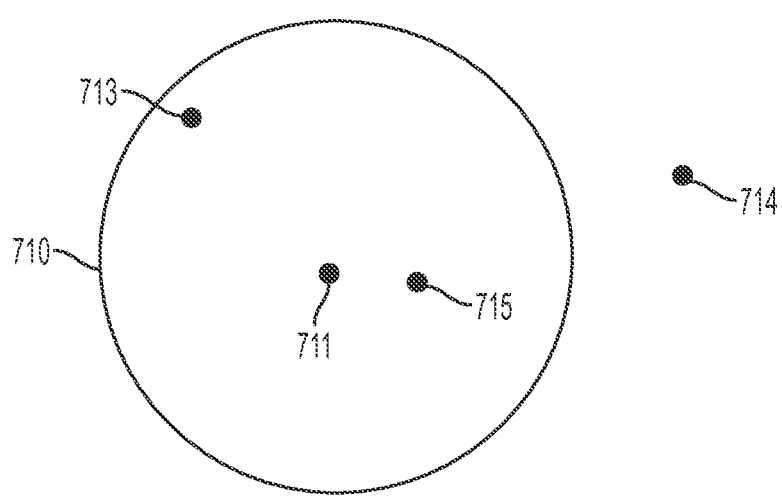

FIG. 7B is an illustration of location information that changes a weight given when judging identified change stated events in an embodiment of the present disclosure.

Referring to FIG. 7B, a location 710 of a smart home system is defined. Point 711 is the location where smart home devices that collected change state events are located. Points 713 and 715 indicate users who are located within the home of the smart home system. Point 719 indicates a user of the smart home system who is not located within the home when the change state events are collected.

As the users at points 713 and 715 are located within the home, there judgment is given greater weight than the user at point 719. Likewise, the user at point 715 is closer to the smart home system devices at point 711 and his or her judgment is considered more reliable than the user at point 713. Thus, when the gamification module of the gateway judges which user to trust more, an increased weight is given to the user's proximity to the actual change state events.

Figure 8:
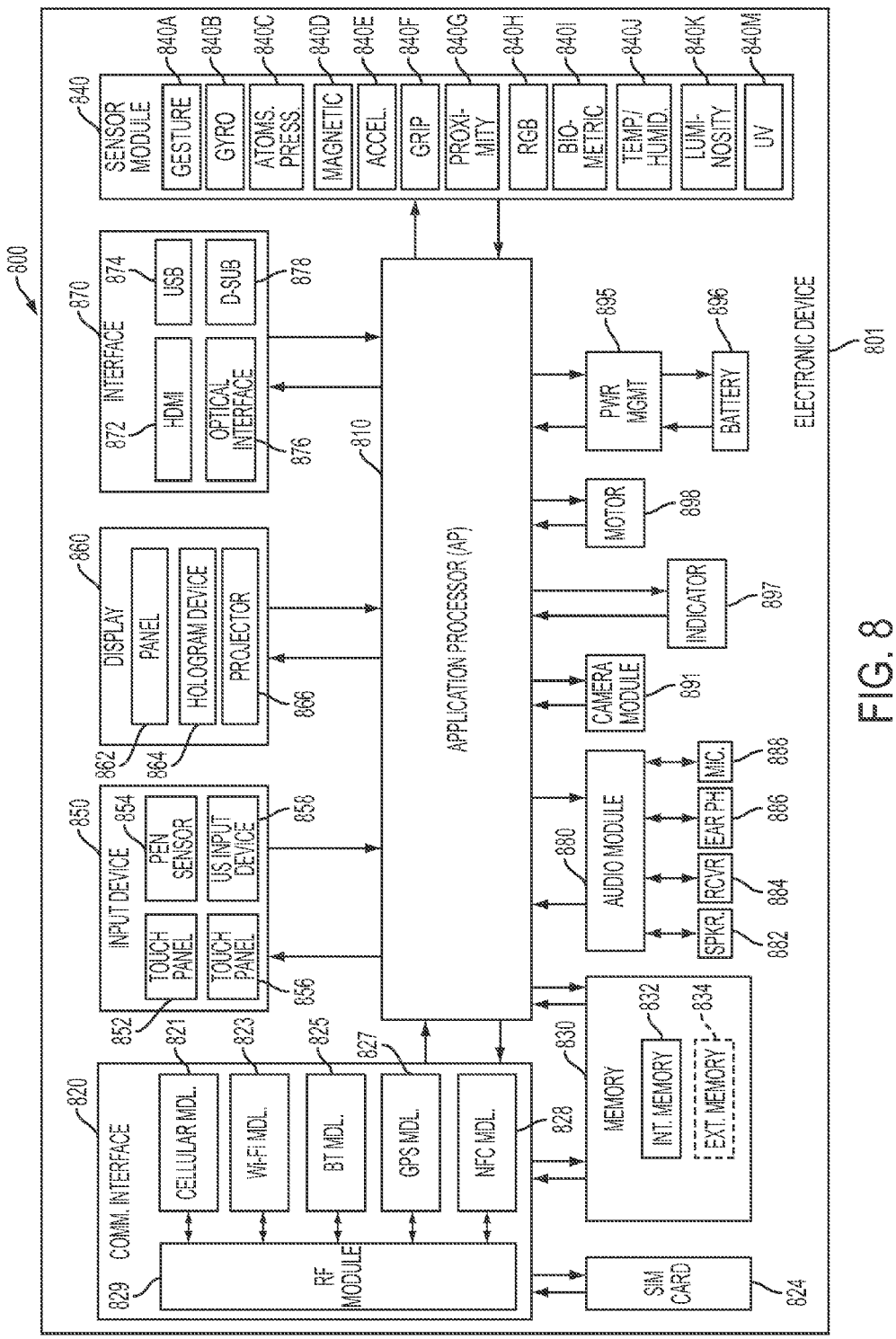
FIG. 8 illustrates a block diagram of hardware according to various embodiments of the present disclosure.

FIG. 8 illustrates a block diagram of hardware according to various embodiments of the present disclosure.

Referring to FIG. 8, hardware 801 may be, for example, a part or all of the electronic device 101. Referring to FIG. 8, the hardware 801 may include one or more Application Processors (AP) 810, a communication module 820, a Subscriber Identification Module (SIM) card 824, a memory 830, a sensor module 840, an input module 850, a display module 860, an interface 870, an audio module 880, a camera module 891, a power management module 895, a battery 896, an indicator 897, a motor 898, and/or the like.

The AP 810 may control one or more hardware or software components that are connected to AP 810, perform processing or computation of data (including multimedia data), and/or the like. As an example, the AP 810 may be implemented as a System-on-Chip (SoC). The AP 810 may include a Graphics Processing Unit (GPU) (not shown).

The communication module 820 (e.g., the communication interface 160) may transmit and receive data in communications between the electronic device 101 and other electronic devices (e.g., the electronic device 104, the server 106, and/or the like). As an example, the communication module 820 may include one or more of a cellular module 821, a Wi-Fi module 823, a Bluetooth module 825, a GPS module 827, a NFC module 828, a Radio Frequency (RF) module 829, and/or the like.

The cellular module 821 may provide services such as, for example, a voice call, a video call, a Short Messaging Service (SMS), internet service, and/or the like, via a communication network (e.g., LTE, LTE-A, CDMA, WCDMA, UMTS, WiBro, GSM, and/or the like). As an example, the cellular module 821 may differentiate and authorize electronic devices within a communication network using a Subscriber Identification Module (SIM) card (e.g., the SIM card 824). According to various embodiments of the present disclosure, the cellular module 821 may perform at least a part of the functionalities of the AP 810. For example, the cellular module 821 may perform at least a part of multimedia control functionality.

According to various embodiments of the present disclosure, the communication interface 820 and/or the cellular module 821 may include a Communication Processor (CP). As an example, the cellular module 821 may be implemented as SoC.

Although FIG. 8 illustrates components such as the cellular module 821 (e.g., CP), the memory 830, the power management module 895 as components that are separate from the AP 810, according to various embodiments of the present disclosure, the AP 810 may include, or be integrated with, one or more of the foregoing components (e.g., the cellular module 821).

According to various embodiments of the present disclosure, the AP 810, the cellular module 821 (e.g., CP), and/or the like, may process instructions or data received from at least one of non-volatile memory or other components by loading in volatile memory. The AP 810, the cellular module 821, the communication interface 820, and/or the like, may store at non-volatile memory at least one of data that is received from at least one of other components or data that is generated by at least one of the other components.

Each of the Wi-Fi module 823, the Bluetooth module 825, the GPS module 827, the NFC module 828, and/or the like may, for example, include one or more processors that may process data received or transmitted by the respective modules. Although FIG. 8 illustrates the cellular module 821, the Wi-Fi module 823, the Bluetooth module 825, the GPS module 827, and the NFC module 828 as separate blocks, according to various embodiments of the present disclosure, any combination (e.g., two or more) of the cellular module 821, the Wi-Fi module 823, the Bluetooth module 825, the GPS module 827, the NFC module 828, and/or the like may be included in an Integrated Chip (IC) or an IC package. For example, at least some of the processors corresponding to the respective the cellular module 821, the Wi-Fi module 823, the Bluetooth module 825, the GPS module 827, the NFC module 828, and/or the like, may be implemented as a single SoC. For example, a CP corresponding to the cellular module 821 and a Wi-Fi processor corresponding to Wi-Fi module 823 may be implemented as a single SoC.

The RF module 829 may, for example, transmit and receive RF signals. Although not shown, the RF module 829 may include a transceiver, a Power Amp Module (PAM), a frequency filter, a Low Noise Amplifier (LNA), and/or the like. The RF module 834 may include one or more components for transmitting and receiving Electro-Magnetic (EM) waves (e.g., in free space or the like) such as, for example, conductors or conductive wires. Although FIG. 8 illustrates that the cellular module 821, the Wi-Fi module 823, the Bluetooth module 825, the GPS module 827, and the NFC module 828 are sharing one RF module 829, according to various embodiments of the present disclosure, at least one of the cellular module 821, the Wi-Fi module 823, the Bluetooth module 825, the GPS module 827, the NFC module 828, and/or the like may transmit and receive RF signals via a separate RF module.

The SIM card 824 may be a card implementing a SIM, and may be configured to be inserted into a slot disposed at a specified location of the electronic device. The SIM card 824 may include a unique identifier (e.g., Integrated Circuit Card IDentifier (ICCID)) subscriber information (e.g., International Mobile Subscriber Identity (IMSI)), and/or the like.

The memory 830 (e.g., memory 130) may include an internal memory 832, an external memory 834, or a combination thereof.

According to various embodiments of the present disclosure, the internal memory 832 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 832 may be a Solid State Drive (SSD). As an example, the external memory 834 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 834 may be operatively coupled to electronic device 801 via various interfaces. According to various embodiments of the present disclosure, the electronic device 801 may include recording devices (or recording media) such as, for example, Hard Disk Drives (HDD), and/or the like.

The sensor module 840 may measure physical/environmental properties detect operational states associated with electronic device 801, and/or the like, and convert the measured and/or detected information into signals such as, for example, electric signals or electromagnetic signals. As an example, the sensor module 840 may include at least one of a gesture sensor 840A, a gyro sensor 840B, an atmospheric pressure sensor 840C, a magnetic sensor 840D, an accelerometer 840E, a grip sensor 840F, a proximity sensor 840G, an RGB sensor 840H, a biometric sensor 840I, a temperature/humidity sensor 840J, a luminosity sensor 840K, a Ultra Violet (UV) sensor 840M, and/or the like. The sensor module 840 may detect the operation state of the electronic device and/or measure physical properties, and convert the detected or measured information into electrical signals. Additionally or alternatively, the sensor module 840 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 840 may also include control circuitry for controlling one or more sensors included therein.

The input module 850 may include a touch panel 852, a (digital) pen sensor 854, a key 856, an ultrasonic input device 858, and/or the like.

As an example, the touch panel 852 may detect touch input using capacitive, resistive, infrared, ultrasonic methods, and/or the like. The touch panel 852 may also include a touch panel controller (not shown). As an example, a capacitive-type touch panel may detect proximity inputs (e.g. hovering input) in addition to, or as an alternative to, physical touch inputs. The touch panel 852 may also include a tactile layer. According to various embodiments of the present disclosure, the touch panel 852 may provide haptic feedback to the user using the tactile layer.

As an example, the (digital) pen sensor 854 may be implemented using methods identical to or similar to receiving a touch input from a user, or using a separate detection sheet (e.g., a digitizer).

As an example, the key 856 may be a keypad, a touch key, and/or the like.

As an example, the ultrasonic input device 858 may be a device configured to identify data by detecting, using a microphone (e.g., microphone 888), ultrasonic signals generated by a device capable of generating the ultrasonic signal. The ultrasonic input device 858 may detect data wirelessly.

According to various embodiments of the present disclosure, the electronic device 801 may receive user input from an external device (e.g., a network, computer or server) connected to the electronic device 801 using the communication module 820.

The display module 860 (e.g., display 150) may include a panel 862, a hologram device 864, a projector 866, and/or the like. As an example, the panel 862 may be, for example, a Liquid-Crystal Display (LCD), an Active-Matrix Organic Light-Emitting Diode (AM-OLED) display, and/or the like. As an example, the panel 862 may be configured to be flexible, transparent, and/or wearable. The panel 862 and the touch panel 852 may be implemented as a single module. The hologram device 864 may provide a three-dimensional image. For example, the hologram device 864 may utilize the interference of light waves to provide a three-dimensional image in empty space. The projector 866 may provide image by projecting light on a surface (e.g., a wall, a screen, and/or the like). As an example, the surface may be positioned internal or external to electronic device 801. According to various embodiments of the present disclosure, the display module 860 may also include a control circuitry for controlling the panel 862, the hologram device 864, the projector 866, and/or the like.

The interface 870 may include, for example, one or more interfaces for a High-Definition Multimedia Interface (HDMI) 872, a Universal Serial Bus (USB) 874, a projector 876, or a D-subminiature (D-sub) 878, and/or the like. As an example, the interface 870 may be part of the communication interface 820. Additionally or alternatively, the interface 870 may include, for example, one or more interfaces for Mobile High-definition Link (MHL), Secure Digital (SD)/ MultiMedia Card (MMC), Infrared Data Association (IrDA), and/or the like.

The audio module 880 may encode/decode sound into electrical signal, and vice versa. According to various embodiments of the present disclosure, at least a portion of audio module 880 may be part of the I/O interface 140. As an example, the audio module 880 may encode/decode voice information that is input into, or output from, the speaker 882, the receiver 884, the earphone 886, the microphone 888, and/or the like.

The camera module 891 may capture still images and/or video. According to various embodiments of the present disclosure, the camera module 891 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 895 may manage electrical power of the electronic device 801. Although not shown, the power management module 895 may include, for example, a Power Management Integrated Circuit (PMIC), a charger Integrated Circuit (charger IC), a battery gauge, a fuel gauge, and/or the like.

As an example, the PMIC may be disposed in an integrated circuit or an SoC semiconductor. The charging method for the electronic device 801 may include wired or wireless charging. The charger IC may charge a battery, may prevent excessive voltage or excessive current from a charger from entering the electronic device 801, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

As an example, the battery gauge may measure a charge level, a voltage while charging, a temperature of battery 896, and/or the like.

As an example, the battery 896 may supply power to the electronic device 801. As an example, the battery 896 may be a rechargeable battery, a solar battery, and/or the like.

The indicator 897 may indicate one or more states (e.g., boot status, message status, charge status, and/or the like) of the electronic device 801 or a portion thereof (e.g., AP 810). Motor 898 may convert an electrical signal into a mechanical vibration.

Although not shown, the electronic device 801 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method for correlating events in a smart home system as a pattern, the method comprising:

collecting, from smart home devices, state change events of the smart home system;

determining whether a series of the collected state change events is a known pattern;

identifying causes of the collected state change events displayed on devices of smart home users via a first input from a number of the devices of the smart home users when the collected state change events is an unknown pattern;

receiving, based on the identifying of the causes of the collected state change events, a second input from the devices of the smart home users of a reason among the identified causes of the collected state change events;

identifying, based on the second input, the collected state change events as the known pattern;

associating, with the reason, a corrective action to be taken by the smart home system in response to identification of the known pattern; and performing the corrective action in response to identification of the known pattern, wherein the first input of the devices of the smart home users closest to a location of the collected state change events is given greater weight than the first input of the devices of the smart home users further away.

2. The method of claim 1, further comprising:
compensating a device of at least one smart home user of the smart home users that is determined to have transmitted the best reason among the identified causes of the collected state change events.

3. The method of claim 1, further comprising:
storing as the known pattern, the reason among the identified causes of the collected state change events when (i) one of the collected state change events is repeated greater than a threshold number of repeats and (ii) a number of the smart home users based on the number of the devices of the smart home users that agree with a corresponding reason is greater than a threshold number of users.

4. The method of claim 3, further comprising:
displaying to the number of the devices of the smart home users, when the reason is known, occurrence of the reason.

5. The method of claim 1, further comprising:
transmitting the stored reason to other smart home systems.

6. The method of claim 1, wherein the series of the collected state change events are at least two state change events that occur within a threshold period of time from each other.

7. A gateway apparatus of a smart home system, the apparatus comprising:
a communication interface configured to transmit and receive data;
at least one processor configured to execute instructions; and
a memory configured to store instructions that, when executed, cause the at least one processor to:
collect, from smart home devices, state change events of the smart home system,
determine whether a series of the collected state change events is a known pattern,
identify causes of the collected state change events displayed on devices of smart home users via a first input from a number of the devices of the smart home users when the collected state change events is an unknown pattern,
control the communication interface to receive, based on the identifying of the causes of the collected state change events, a second input from the devices of the smart home users of a reason among the identified causes of the collected state change events,
identify, based on the second input, the collected state change events as the known pattern;
associate, with the reason, a corrective action to be taken by the smart home system in response to identification of the known pattern; and
perform the corrective action in response to identification of the known pattern, wherein the first input of the devices of the smart home users closest to a location of the collected state change events is given greater weight than the first input of the devices of the smart home users further away.

8. The apparatus of claim 7, wherein the at least one processor is further configured to compensate a device of at least one smart home user of the smart home users that is determined to have transmitted the best reason among the identified causes of the collected state change events.

9. The apparatus of claim 7, wherein the at least one processor is further configured to store as the known pattern, the reason among the identified causes of the collected state change events when (i) one of the collected state change events is repeated greater than a threshold number of repeats and (ii) a number of the smart home users based on the number of the devices of the smart home users who agree with a corresponding reason is greater than a threshold number of users.

10. The apparatus of claim 9, wherein the at least one processor is further configured to control the communication interface to transmit for display on the device of the smart home user, when the reason is known, occurrence of the reason.

11. The apparatus of claim 7, wherein the at least one processor is further configured to control the communication interface to transmit the reason to other smart home systems.

12. The apparatus of claim 7, wherein the series of the collected state change events are at least two state change events that occur within a threshold period of time from each other.

13. A non-transitory computer-readable storage medium storing instructions that, when executed, cause at least one processor to:
collect, from smart home devices, state change events of the smart home system,
determine whether a series of the collected state change events is a known pattern,
identify causes of the collected state change events displayed on devices of smart home users via a first input from a number of the devices of the smart home users when the collected state change events is an unknown pattern,
control a communication interface to receive, based on the identifying of the causes of the collected state change events, a second input from the devices of the smart home users of a reason among the identified causes of the collected state change events,
identify, based on the second input, the collected state change events as the known pattern;
associate, with the reason, a corrective action to be taken by the smart home system in response to identification of the known pattern; and
perform the corrective action in response to the identification of the known pattern, wherein the first input of the devices of the smart home users closest to a location of the collected state change events is given greater weight than the first input of the devices of the smart home users further away.

* * * * *